United States Patent
Jung et al.

(10) Patent No.: US 10,123,246 B2
(45) Date of Patent: *Nov. 6, 2018

(54) METHOD FOR COMMUNICATING IN WIRELESS COMMUNICATION SYSTEM SUPPORTING MULTIPLE ACCESS NETWORK AND APPARATUS SUPPORTING SAME

(71) Applicant: LG ELECTRONICS INC., Seoul (KR)

(72) Inventors: Sunghoon Jung, Seoul (KR); Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,663

(22) Filed: Oct. 16, 2017

(65) Prior Publication Data
US 2018/0041935 A1 Feb. 8, 2018

Related U.S. Application Data

(63) Continuation of application No. 14/649,501, filed as application No. PCT/KR2013/011905 on Dec. 19, 2013, now Pat. No. 9,826,451.
(Continued)

(51) Int. Cl.
*H04W 36/14* (2009.01)
*H04W 72/04* (2009.01)
*H04W 48/18* (2009.01)

(52) U.S. Cl.
CPC ........... *H04W 36/14* (2013.01); *H04W 48/18* (2013.01); *H04W 72/0486* (2013.01)

(58) Field of Classification Search
CPC .. H04W 36/14; H04W 72/0486; H04W 48/18
See application file for complete search history.

(56) References Cited

U.S. PATENT DOCUMENTS

| 9,560,585 B2 | 1/2017 | Forssell | |
|---|---|---|---|
| 2005/0090255 A1* | 4/2005 | Kuchibhotla | H04W 48/18 455/435.2 |

(Continued)

FOREIGN PATENT DOCUMENTS

| CN | 1934880 | 3/2007 |
|---|---|---|
| CN | 102318237 | 1/2012 |

(Continued)

OTHER PUBLICATIONS

Russian Patent Office Application No. 2015129521, Office Action dated Aug. 29, 2016, 6 pages.

(Continued)

*Primary Examiner* — Ajay Cattungal
(74) *Attorney, Agent, or Firm* — Lee Hong Degerman Kang Waimey

(57) ABSTRACT

Provided is a method for communicating carried out by a terminal in a wireless communication system supporting a multiple access network. The method comprises receiving from a first access network second access network service information, determining whether traffic processing through the second access network is allowed based on the second access network service information, and processing all or a portion of the traffic on the first access network through the second access network.

20 Claims, 15 Drawing Sheets

Related U.S. Application Data

(60) Provisional application No. 61/739,697, filed on Dec. 19, 2012.

(56) References Cited

U.S. PATENT DOCUMENTS

| | | | | |
|---|---|---|---|---|
| 2006/0094427 | A1* | 5/2006 | Buckley | H04W 48/16 455/434 |
| 2006/0095954 | A1* | 5/2006 | Buckley | H04L 63/08 726/2 |
| 2006/0187892 | A1* | 8/2006 | Zhang | H04W 48/18 370/338 |
| 2007/0026866 | A1 | 2/2007 | Krishnamurthi et al. | |
| 2007/0191006 | A1* | 8/2007 | Carpenter | H04W 48/16 455/435.2 |
| 2008/0020756 | A1* | 1/2008 | Jiang | H04W 24/00 455/432.1 |
| 2008/0020761 | A1* | 1/2008 | Park | H04W 48/16 455/434 |
| 2008/0153486 | A1* | 6/2008 | Ramkull | H04W 48/18 455/434 |
| 2008/0220773 | A1* | 9/2008 | Buckley | H04W 48/18 455/433 |
| 2008/0287125 | A1* | 11/2008 | Hind | H04W 48/18 455/432.1 |
| 2010/0067375 | A1* | 3/2010 | Ianev | H04W 36/22 370/230 |
| 2010/0093345 | A1* | 4/2010 | Verhoef | H04W 48/18 455/433 |
| 2010/0291863 | A1 | 11/2010 | Hsu et al. | |
| 2011/0096731 | A1 | 4/2011 | Kamalaraj et al. | |
| 2011/0286437 | A1 | 11/2011 | Austin et al. | |
| 2012/0020204 | A1* | 1/2012 | Morera | H04W 48/18 370/217 |
| 2012/0178448 | A1 | 7/2012 | Yuk et al. | |
| 2013/0203435 | A1* | 8/2013 | Smith | H04W 16/14 455/454 |
| 2014/0004854 | A1 | 1/2014 | Veran et al. | |
| 2014/0029420 | A1 | 1/2014 | Jeong et al. | |
| 2015/0282058 | A1 | 10/2015 | Forssell | |
| 2015/0296440 | A1 | 10/2015 | Forssell et al. | |
| 2015/0319659 | A1 | 11/2015 | Jung et al. | |
| 2016/0242111 | A1* | 8/2016 | Wakabayashi | H04W 4/70 |
| 2016/0277956 | A1* | 9/2016 | Lindheimer | H04W 36/22 |

FOREIGN PATENT DOCUMENTS

| | | |
|---|---|---|
| CN | 102740366 | 10/2012 |
| EP | 1796329 | 6/2007 |
| EP | 2437551 A1 | 4/2012 |
| JP | 2004-526218 | 8/2004 |
| JP | 2005184824 | 7/2005 |
| JP | 2007-159005 | 6/2007 |
| JP | 2011511491 | 4/2011 |
| KR | 10-2002-0013768 | 2/2002 |
| KR | 10-2010-0065388 A | 6/2010 |
| KR | 10-2011-0026504 | 3/2011 |
| KR | 10-2012-0109447 A | 10/2012 |
| RU | 2395912 C2 | 7/2010 |
| WO | 02/017034 | 2/2002 |
| WO | 2005089249 A2 | 9/2005 |
| WO | 2009099256 | 8/2009 |
| WO | 2011110108 A1 | 9/2011 |

OTHER PUBLICATIONS

Janne Tervonen, "Deliverable DA2.2.22 Offloading Traffic from Cellular Networks with PBRM", ICT SHOK Future Internet Programme(ICT SHOK FI), XP0079159591, Jun. 30, 2010, 40 pages.

Savio Dimatteo et al., "Cellular Traffic Offloading through WiFi Networks", 2011 Eigth IEEE International Conference on Mobile Ad-Hoc and Sensor Systems, XP032021865, Oct. 17, 2011, 10 pages.

European Patent Office Application No. 13865427.2, Search Report dated Jul. 25, 2016, 10 pages.

PCT International Application No. PCT/KR2013/011905, Written Opinion of the International Searching Authority dated Mar. 26, 2014, 1 page.

Ericsson, "Harmonized solution for WLAN/3GPP Radio interworking", 3GPP TSG-RAN WG2 #84, Tdoc R2-134257, Nov. 1, 2013, 5 pages.

Korean Patent Office Application No. 10-2015-7016157, Office Action dated Apr. 14, 2016, 5 pages.

Japanese Patent Office Application No. 2015-549263, Office Action dated Apr. 26, 2016, 4 pages.

Japan Patent Office Application No. 2017-040578, Office Action dated Feb. 23, 2018, 3 pages.

State Intellectual Property Office of the People's Republic of China Application Serial No. 201380066358.8, Office Action dated Dec. 5, 2017, 8 pages.

* cited by examiner

METHOD FOR COMMUNICATING IN WIRELESS COMMUNICATION SYSTEM SUPPORTING MULTIPLE ACCESS NETWORK AND APPARATUS SUPPORTING SAME

CROSS-REFERENCE TO RELATED APPLICATIONS

This application is a continuation of U.S. patent application Ser. No. 14/649,501, filed on Jun. 3, 2015, now U.S. Pat. No. 9,826,451, which is the National Stage filing under 35 U.S.C. 371 of International Application No. PCT/KR2013/011905, filed on Dec. 19, 2013, which claims the benefit of U.S. Provisional Application No. 61/739,697, filed on Dec. 19, 2012, the contents of which are all hereby incorporated by reference herein in their entirety.

BACKGROUND OF THE INVENTION

Field of the Invention

The present invention relates to wireless communication, and more particularly, to a communication method performed in a wireless communication system supporting communication through a multiple access network and an apparatus supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

The wireless communication system can support providing a service through a plurality of access networks to the terminal. The terminal can receive the service from a 3GPP based access network such as a mobile wireless communication system and further, receive a service from non-3GPP based access networks such as Worldwide Interoperability for Microwave Access (WiMAX), Wireless Local Area Network (WLAN), and the like.

The terminal generally can receive a service by establishing connection with a 3GPP based access network. Meanwhile, when a traffic overload is generated in the 3GPP based access network, processing traffic which the terminal intends to process through another access network can improve overall efficiency of the network.

A communication method that supports the terminal to perform communication by accessing the corresponding access network is required to be proposed in order to process the traffic of the terminal through another access network.

SUMMARY OF THE INVENTION

The present invention provides a method for communicating in a wireless communication system supporting a multiple access network and an apparatus supporting the same.

In one aspect, provided is a method for communicating, which is performed by a terminal in a wireless communication system supporting a multiple access network. The method includes receiving second access network service information from a first access network, determining whether traffic is permitted to be processed through a second access network based on the second access network service information and processing all or some of traffic on the first access network through the second access network when the traffic processing through the second access network is permitted.

The second access network service information may include an identifier list, and the identifier list may include an identifier of at least one second access network entity which is permitted to process the traffic.

The determining whether the traffic processing through the second access network is permitted may include discovering the second access network entity, and deciding that the traffic is permitted to be processed through the second access network when an identifier of the second access network entity found as a result of the discovery is included in the identifier list.

The second access network service information may include validity information indicating a validity reference of the second access network service information. The method may further include determining whether the second access network service information is valid based on the validity information, and the determining whether the traffic processing through the second access network is permitted is performed when the second access network service information is valid.

The validity information may indicate valid duration based on the validity, and in the determining whether the second access network service information is valid, it is determined that the second access network service information is valid when a determination time is within the valid duration.

The validity information may indicate a valid area based on the validity. The determining whether the second access network service information is valid may include determining that the second access network service information is valid when the terminal is within the valid area indicated by the validity information.

The validity information may indicate a geometric area as the valid area.

The validity information may include a cell list in which the second access network service information is valid as the valid area.

The validity information may include a public land mobile network (PLMN) list in which the second access network service information is valid as the valid area.

The method may further comprise processing the traffic through the first access network when the traffic processing through the second access network is not permitted.

The first access network may be a 3rd generation partnership project (3GPP) based access network, and the second access network may be a wireless local area network (WLAN) based access network.

The second access network service information may be transmitted while being included in system information broadcasted from the first access network.

The second access network service information may be transmitted while being included in a radio resource control (RRC) message transmitted from the first access network.

The processing of all or some of the traffic on the first access network through the second access network may include performing authentication and association procedures with the second access network, and transmitting a data frame associated with the traffic to the second access network.

In another aspect, a wireless apparatus that operates in a wireless communication system is provided. The wireless apparatus includes a first RF unit transmitting and receiving a first access network signal, a second RF unit transmitting and receiving a second access network signal and a processor that operates in functional combination with the first RF unit and the second RF unit. The processor is configured to receive second access network service information from the first access network, determine whether traffic is permitted to be processed through the second access network based on the second access network service information, and process all or some of traffic on the first access network through the second access network when the traffic processing through the second access network is permitted.

A 3GPP access network provides service information so as for a terminal to perform communication by accessing another access network. The terminal can discover and access another access network through the service information. Therefore, terminal's attempt to discover and access an unnecessary non-3GPP access network is avoided to prevent unnecessary power consumption of the terminal. Since some and/or all of traffic of the terminal can be processed through another access network, efficiency of traffic processing can be improved and an overload phenomenon of the 3GPP based access network can be alleviated. Accordingly, a QoS for the corresponding traffic can be prevented from being deteriorated.

DESCRIPTION OF EXEMPLARY EMBODIMENTS

Figure 1:
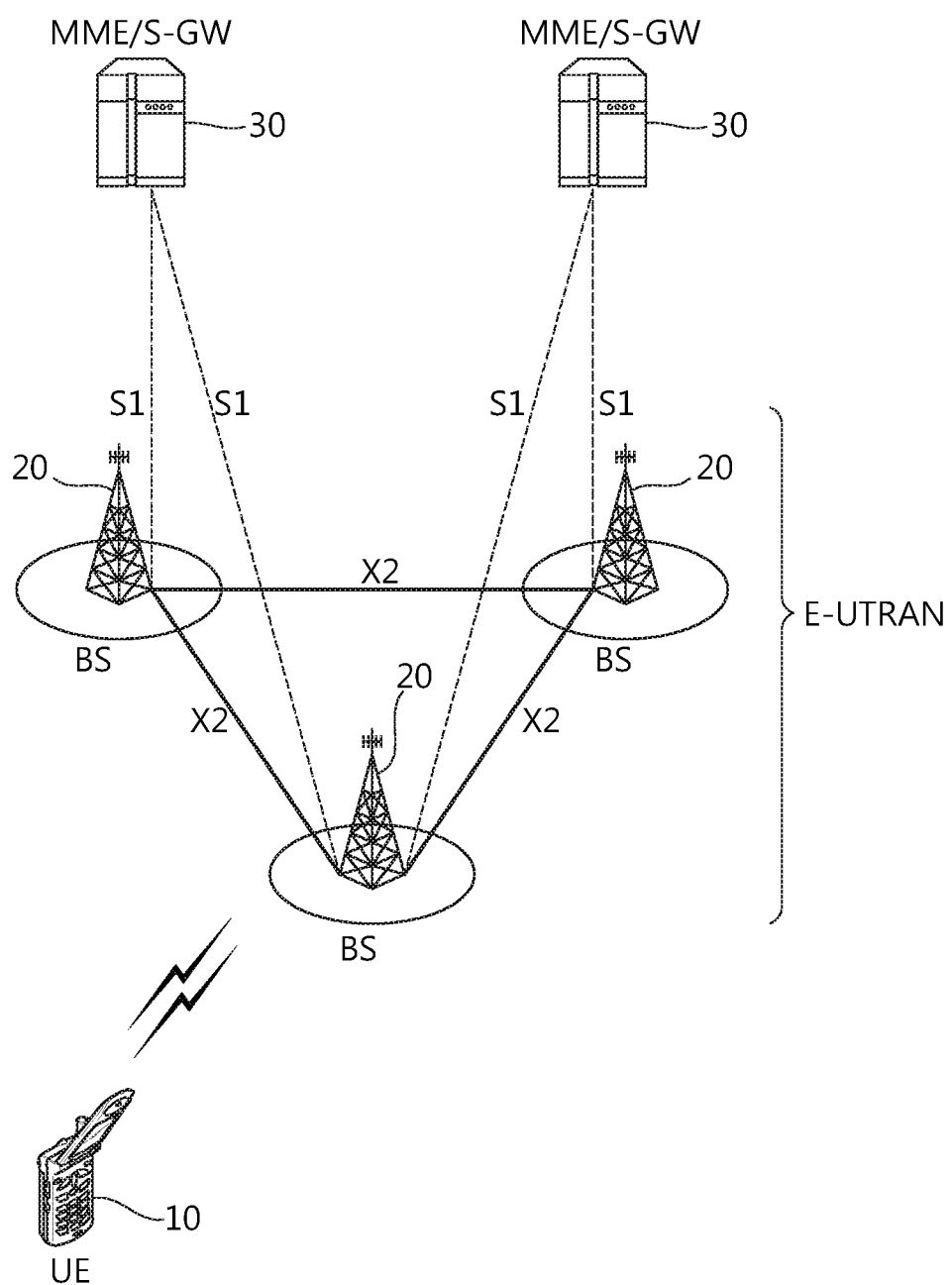
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
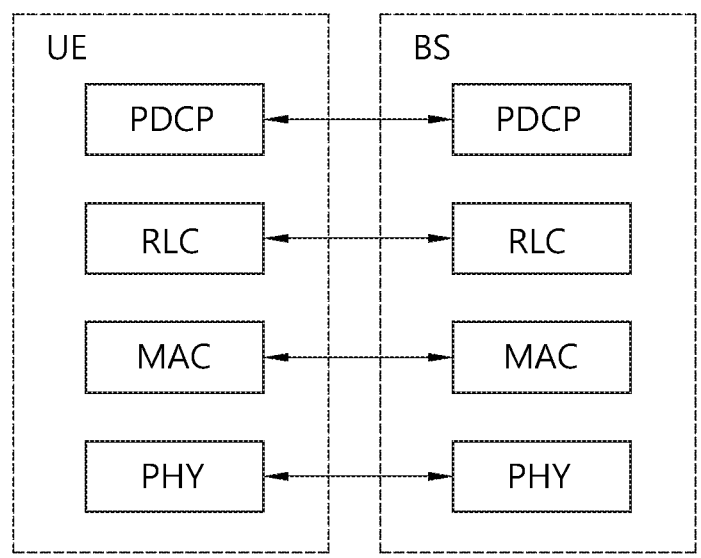
FIG. 2 is a block diagram illustrating a radio protocol architecture for a user plane.
Figure 3:
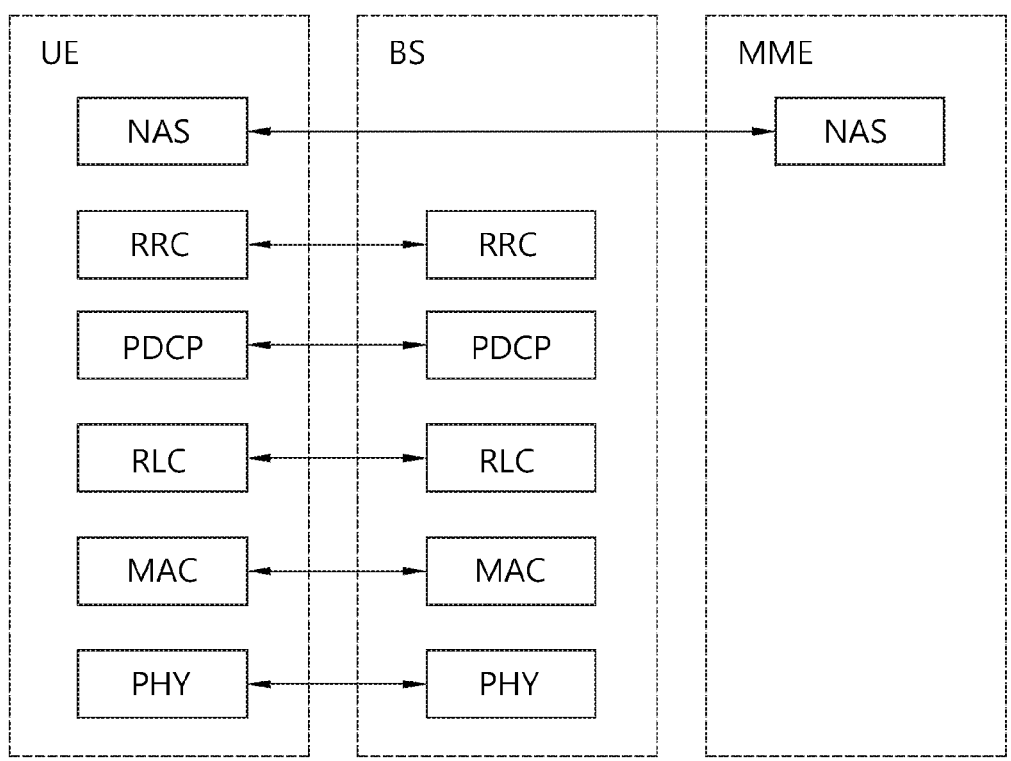
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are control channels.

The PCFICH transmitted in a first OFDM symbol of the subframe transports a control format indicator (CFI) regarding the number (that is, the size of the control region) of OFDM symbols used to transmit control channels in the subframe. The terminal first receives the CFI on the PCFICH and thereafter, monitors the PDCCH.

The PDCCH as a downlink control channel is also referred to as a scheduling channel in terms of transporting scheduling information. Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE, the terminal uses blind decoding in order to detect the PDCCH. The blind decoding is a scheme that checks a CRC error by demasking a desired identifier to a CRC of a received PDCCH (referred to as a PDCCH candidate) to check whether the corresponding PDCCH is a control channel thereof.

The base station determines a PDCCH format according to a DCI to be transmitted to the terminal and then adds a cyclic redundancy check (CRC) to the DCI, and masks a unique identifier (referred to as a radio network temporary identifier (RNTI)) to the CRC according to an owner or a usage of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection state operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle state: It needs to be guaranteed that the terminal has valid versions of the MIB and the SIB1 as well as the SIB2 to SIB8 and this may be followed by supporting a considered RAT.

In the case where the terminal is in an RRC connection state: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
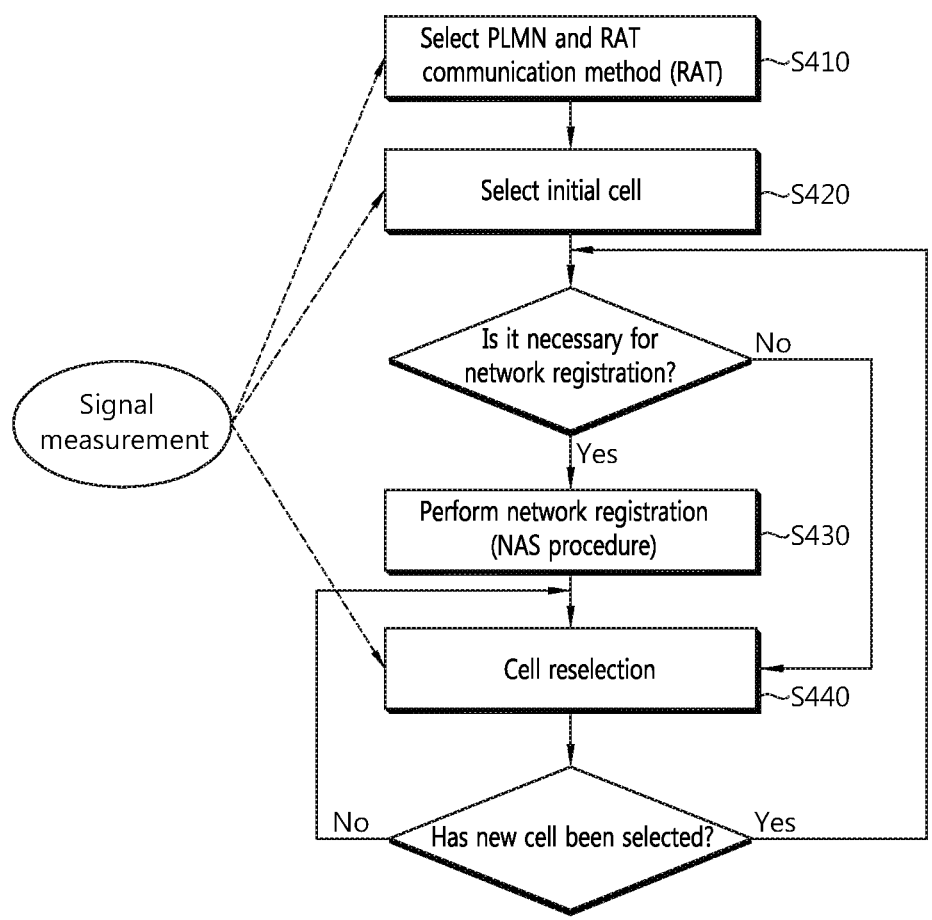
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
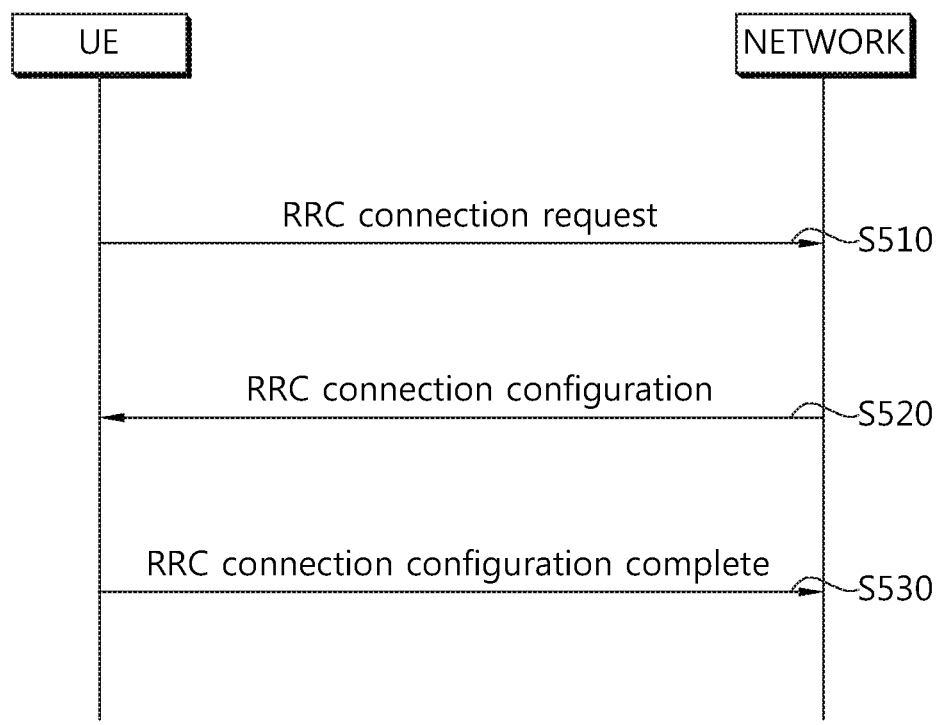
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
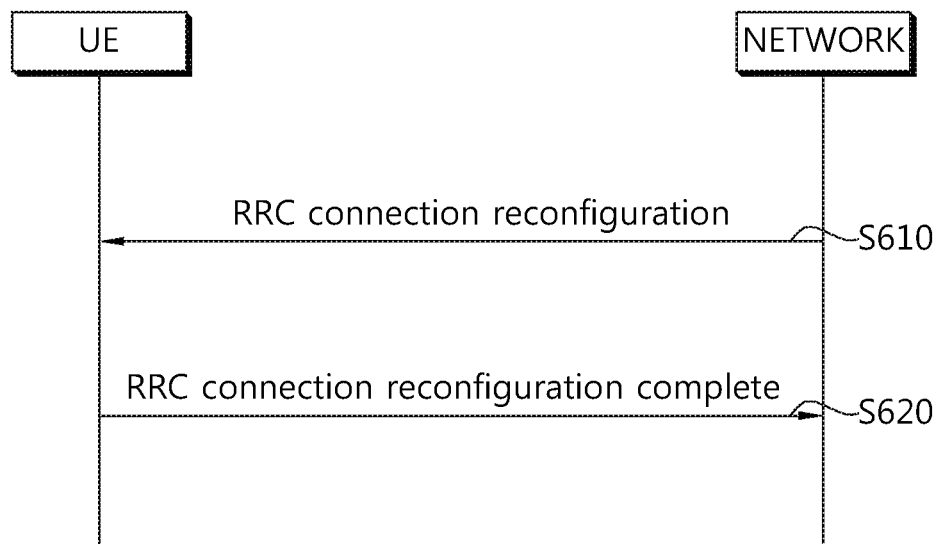
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

A cell selection criterion may be defined as shown in Equation 1 given below.

$Srxlev > 0$ AND $Squal > 0$ where:

$Srxlev = Q_{rxlevmeas} - Q_{rxlevmin} + Q_{rxlevminoffset}) - Pcompensation$ $Squal = Q_{qualmeas} - (Q_{qualmin} + Q_{qualminoffset})$ [Equation 1]

Herein, each variable of Equation 1 may be defined as shown in Table 1 given below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$ which are signaled values as a result of a periodic search for a PLMN having a higher priority while the terminal camps on a normal cell may be applied only when cell selection is evaluated. During the periodic search for the PLMN having the higher priority, the terminal may perform the cell selection evaluation by using parameter values stored from another cell of the PLMN having the higher priority.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, \quad R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

When the terminal perform cell reselection according to the cell reselection evaluation, the terminal may decide that a cell reselection criterion is satisfied when the cell reselection criterion is satisfied for a specific time and move the cell to the selected target cell. Herein, the specific time may be given from the network as a Treselection parameter. The Treselection may specify a cell reselection timer value and be defined with respect to each frequency and another RAT of the E-UTRAN.

Hereinafter, cell reselection information used for the cell reselection by the terminal will be described.

The cell reselection information may be transmitted while being included in the system information broadcasted from the network in a format of the cell reselection parameter and provided to the terminal. The cell reselection parameter provided to the terminal may include the following types.

Cell Reselection Priority: The cellReselectionPriority parameter specifies the priority of a frequency of the E-UTRAN, a frequency of the UTRAN, a group of GERAN frequencies, a band class of CDMA2000 HRPD, or a band class of CDMA2000 1xRTT.

$Qoffset_{s,n}$: Specifies an offset value between two cells.

$Qoffset_{frequency}$: Specifies a frequency specific offset for the E-UTRAN having the same priority.

$Q_{hyst}$: Specifies a hysteresis value for a rank index.

$Q_{qualmin}$: Specifies a minimally required quality level and specified by the unit of dB.

$Q_{rxlevmin}$: Specifies a minimally required Rx level and specified by the unit of dB.

$Treselection_{EUTRA}$: Specifies the cell reselection timer value for the E-UTRAN and may be configured with respect to each frequency of the E-UTRAN.

$Treselection_{UTRAN}$: Specifies the cell reselection timer value for the UTRAN.

$Treselection_{GERA}$: Specifies the cell reselection timer value for the GERAN.

$Treselection_{CDMA\_HPRD}$: Specifies the cell reselection timer value for the CDMA HRPD.

$Treselection_{CDMA\_1xRTT}$: Specifies the cell reselection timer value for the CDMA 1xRTT.

Thresh$_{x,\ HighP}$: An Srxlev threshold value used by the terminal when reselection to an RAT/frequency having a higher priority than a serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,\ HighQ}$: An Squal threshold value used by the terminal when reselection to the RAT/frequency having the higher priority than the serving frequency is specified by the unit of dB. Specific threshold values may be individually configured with respect to each frequency of the E-TRAUN and the UTRAN FDD.

Thresh$_{x,\ LowP}$: The Srxlev threshold value used by the terminal when reselection to an RAT/frequency having a lower priority than the serving frequency is specified by the unit of dB. Specific threshold values may be individually configured with respect to the frequencies of the E-UTRAN and the UTRAN, each group of the GERAN frequency, each band class, and each band class of the CDMA2000 1×rtt.

Thresh$_{x,\ LowQ}$: The Squal threshold value used by the terminal when reselection to the RAT/frequency having the lower priority than the serving frequency is specified by the unit of dB. Specific threshold values may be individually configured with respect to each frequency of the E-TRAUN and the UTRAN FDD.

Thresh$_{Serving,\ LowP}$: The Srxlev threshold value used by the terminal on the serving cell when reselection to the lower RAT/frequency is specified by the unit of dB.

Thresh$_{Serving,\ LowQ}$: The Squal threshold value used by the terminal on the serving cell when reselection to the lower RAT/frequency is specified by the unit of dB.

$S_{IntraSerachP}$: An Srxlev threshold value for intra-frequency measurement is specified by the unit of dB.

$S_{IntraSerachQ}$: An Squal threshold value for intra-frequency measurement is specified by the unit of dB.

$S_{nonIntraSerachP}$: An Srxleve threshold value for E-UTRAN intra-frequency and inter-RAT measurement are specified by the unit of dB.

$S_{nonIntraSerachQ}$: An Squal threshold value for E-UTRAN intra-frequency and inter-RAT measurement are specified by the unit of dB.

Meanwhile, the aforementioned cell reselection parameter may be scaled according to mobility of the terminal. The mobility of the terminal may be estimated based on the number of times when the terminal moves through cell reselection and/or handover during a specific time interval and this is referred to as mobility state estimation (MSE). The mobility of the terminal may be estimated as one of a normal mobility state, a medium mobility state, and a high mobility state according to the MSE.

A parameter which may be used as a reference for estimating the mobility state of the terminal in the MSE may be provided. $T_{CRmax}$ specifies a specific time interval for counting moving execution of another terminal. $N_{CR\_H}$ indicates the maximum number of times of cell reselection for entering the high mobility. $N_{CR\_M}$ indicates the maximum number of times of cell reselection for entering the medium mobility. $T_{CRmaxHyst}$ specifies an additional time interval before the terminal may enter the general mobility state.

A terminal that is in an RRC_IDLE state performs the cell reselection when a cell reselection condition is satisfied. When the number of times at which the terminal performs the cell reselection for $T_{CRmax}$ is more than $N_{CR\_H}$ which is a first threshold value, a condition of the high mobility state is satisfied as the mobility state of the terminal. When the number of times at which the terminal performs the cell reselection for $T_{CRmax}$ is more than $N_{CR\_M}$ which is a second threshold value and not more than $N_{CR\_H}$ which is the first threshold value, a condition of the medium mobility state is satisfied as the mobility state of the terminal. When the number of times when the terminal performs the cell reselection for $T_{CRmax}$ is not more than $N_{CR\_M}$ which is the second threshold value, a condition of the normal mobility state is satisfied as the mobility state of the terminal. For example, when it is not sensed that the terminal is in the high mobility state and the normal mobility state during an additional time interval $T_{CRmaxHyst}$, it may be estimated that the terminal is in the normal mobility state. However, when the terminal performs the cell reselection consecutively between two same cells, the cell reselection may not be counted as the number of cell reselection times.

A scaling factor may be specified according to the mobility state of the terminal according to the MSE and the scaling factor may be applied to one or more cell reselection parameters. For example, sf-Medium and sf-High which are scaling factors according to the medium mobility and the high mobility may be applied to Qhyst, Treselection$_{EUTRA}$, Treselection$_{UTRA}$, Treselection$_{GERA}$, Treselection$_{CDMA\_HRPD}$, and Treselection$_{CDMA\_1\times RTT}$.

Meanwhile, the cell reselection information may be provided to the terminal while being included in an RRC disconnection message which is an RRC message for RRC disconnection between the network and the terminal. For example, the RRC disconnection message may include a subcarrier frequency list and the cell reselection priority of the E-UTRAN, a subcarrier frequency list and the cell reselection priority of the UTRA-FDD, a subcarrier frequency list and the cell reselection priority of the UTRA-TDD, a subcarrier frequency list and the cell reselection priority of the GERAN, the band class list and the cell reselection priority of the CDMA2000 HRPD, and the band class list and the cell reselection priority of the CDMA2000 1×RTT.

Hereinafter, sharing an RAN by multiple operators will be described.

The multiple operators may provide the service by individually constructing the RAN, but provide the service to a subscriber by sharing a cell constructed by a specific operator. This is referred to as RAN sharing. In this case, the cell shared by the multiple providers may broadcast a PLMN list. The PLMN list may be transmitted while being included in SIB1 of the system information broadcasted by the cell. Meanwhile, a PLMN identifier first listed in the PLMN list included in the SIB1 may be implemented to indicate a primary PLMN.

Under a situation in which one cell is shared by the multiple operators, the cell reselection information provided by the shared cell may be commonly applied to all PLMNs in the PLMN list. In general, the cell reselection information provided by the shared cell is configured to primarily coincide with a policy of the primary PLMN. Therefore, terminals receiving a service depending on a secondary PLMN perform the cell reselection based on information other than the cell reselection information optimized for providing the service.

Hereinafter, the handover related with movement of the terminal in the RRC connection state will be described.

Figure 7:
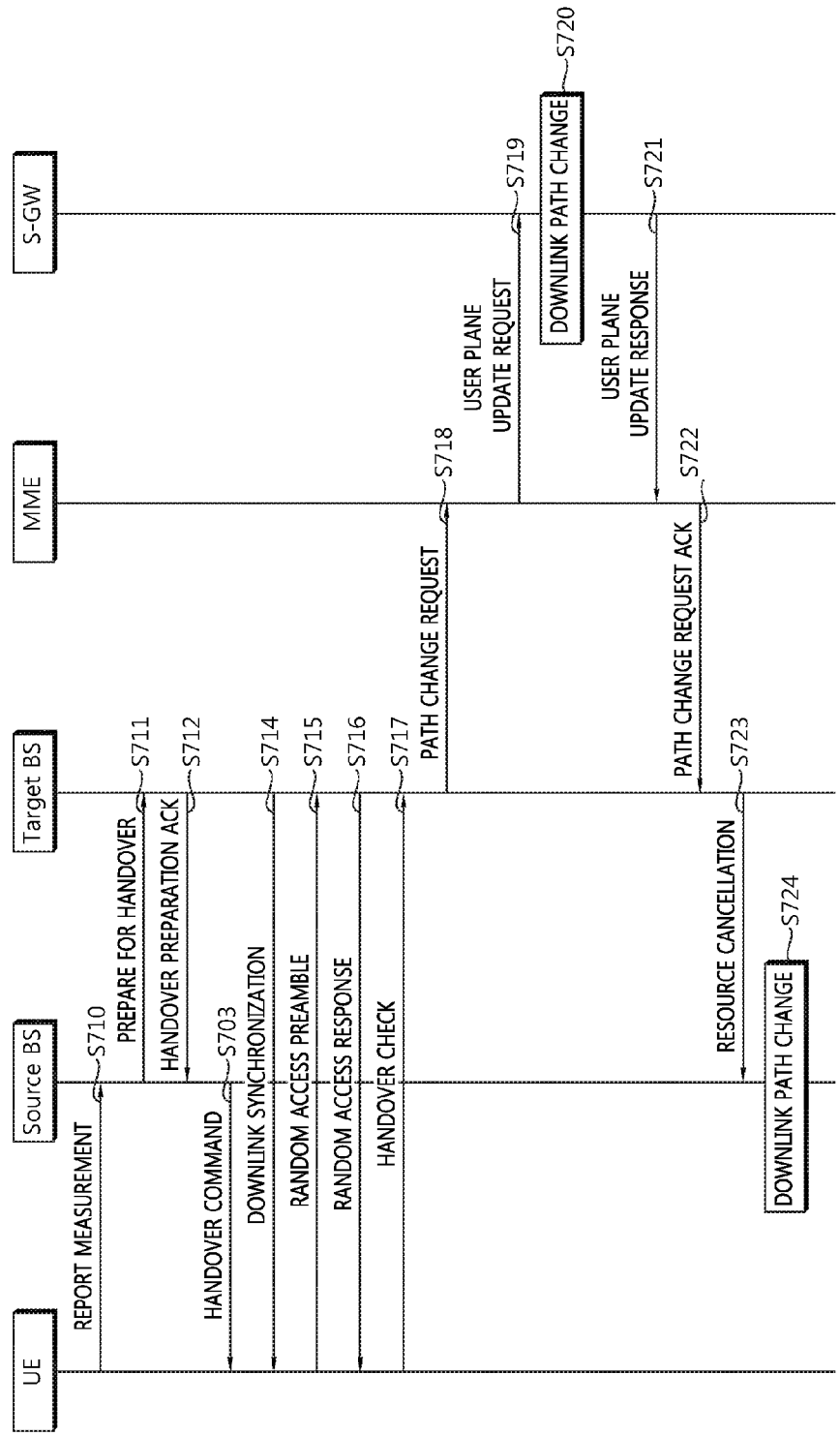
FIG. 7 is a flowchart illustrating a handover process.

FIG. 7 is a flowchart illustrating a handover process.

The terminal (UE) transmits a measurement report to a source base station (BS) (S710). The source base station decides whether to perform the handover by using the received measurement report. When the source base station decides the handover to a contiguous cell, the continuous cell becomes a target cell and a base station that belongs to the target cell becomes a target base station (BS).

The source base station transmits a handover preparation message to the target base station (S711). The target base station performs admission control in order to increase a success possibility of the handover.

The target base station transmits a handover preparation acknowledgement (ACK) message to the source base station (S712). The handover preparation acknowledgement (ACK) message may include a cell-radio network temporary identifier (C-RNTI) and/or a dedicated random access preamble. The C-RNTI is an identifier for identifying the terminal in the cell. The dedicated random access preamble as a preamble which the terminal may exclusively use during a predetermined period is used in performing the non-contention based random access. The random access process may be divided into a contention based random access process using the predetermined random access preamble and the non-contention based random access process using the dedicated random access preamble. The non-contention based random access process may prevent a delay of the handover due to contention with other terminals as compared with the contention based random access process.

The source base station transmits a handover command message to the terminal (S713). The handover command message may be transmitted in a form of a radio resource control (RRC) connection reconfiguration message. The handover command message may include the C-RNTI and the dedicated random access preamble received from the target base station.

The terminal receives the handover command message from the source base station and thereafter, synchronizes with the target base station (S714). The terminal receives a PSS and an SSS of the target base station to synchronize the PSS and the SS and receives the PBCH to acquire the system information.

The terminal transmits the random access preamble to the target base station to start the random access process (S715). The terminal may use the dedicated random access preamble included in the handover command message. Alternatively, if the dedicated random access preamble is not allocated, the terminal may use a predetermined random access preamble selected in a random access preamble set.

The target base station transmits a random access response message to the terminal (S716). The random access response message may include uplink resource allocation and/or time offset (timing advance).

The terminal that receives the random access response message adjusts uplink synchronization based on the time offset and transmits a handover confirm message to the target base station by using the uplink resource allocation (S717). The handover confirm message may indicate that the handover process is completed and be transmitted together with an uplink buffer status report.

The target base station transmits a path switch request message to a mobility management entity (MME).

The MME transmits a user plane update request message to a serving-gateway (S-GW) (S719).

The S-GW switches a downlink data path to the target base station (S720).

The S-GW transmits a user plane update response message to the MME (S721).

The MME transmits a path switch request ACK message to the target base station (S722).

The target base station transmits a resource release message to the source base station to notify the success of the handover (S723).

The source base station release a resource related to the terminal (S724).

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 8:
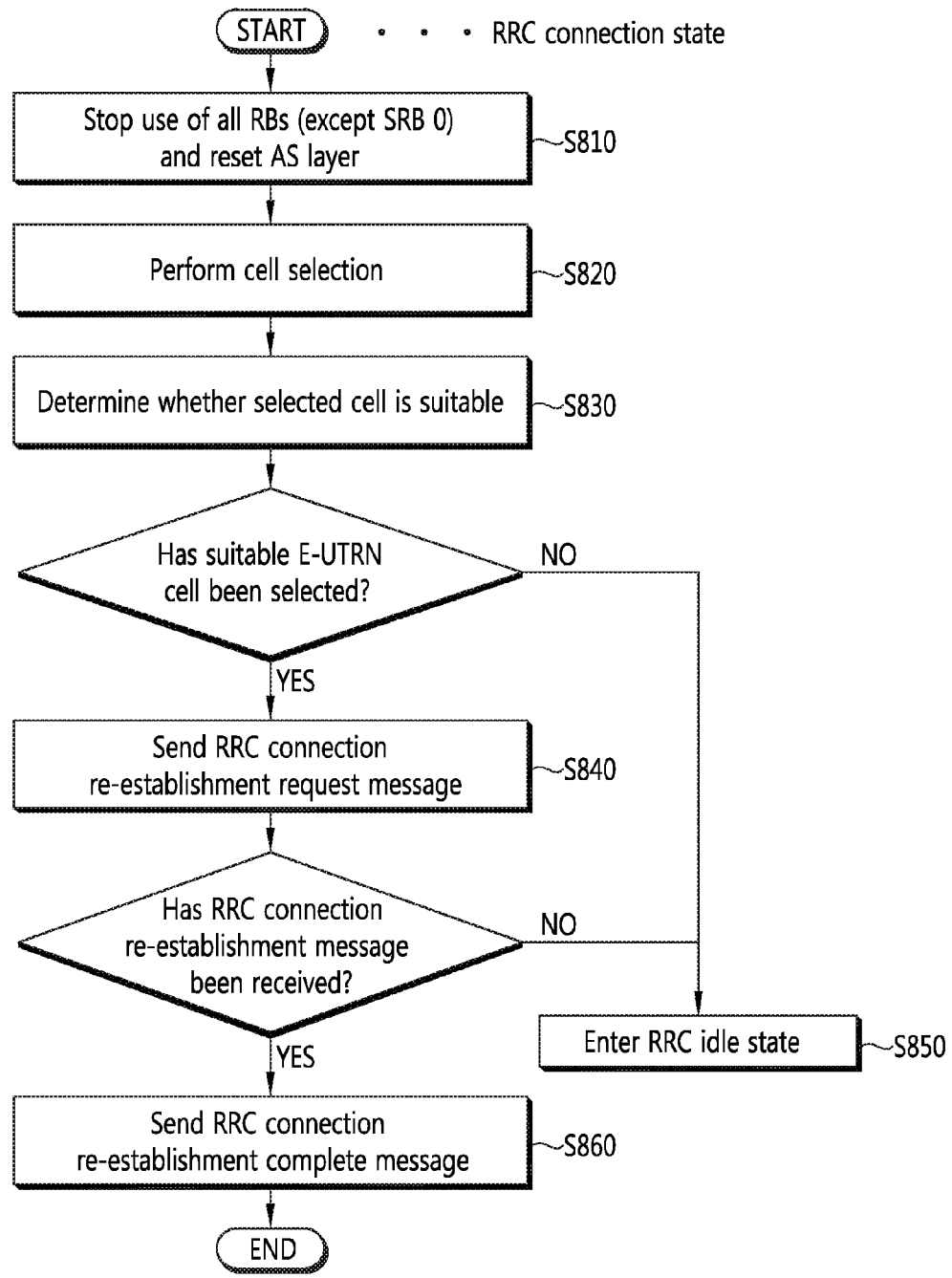
FIG. 8 is a flowchart illustrating an RRC connection reconfiguration process.

FIG. 8 is a diagram illustrating a RRC connection re-establishment procedure.

Referring to FIG. 8, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S820). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S830). When it is determined that the selected cell is the suitable E-UTRAN cell, the UE transmits an RRC connection reestablishment request message to the corresponding cell (S840).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S850).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S860).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, interworking between the 3GPP based access network and another access network will be described.

In the 3GPP, access network discovery and selection functions (ANDSF) for discovering and selecting an accessible access network while introducing interworking with a non-3GPP access network (e.g., WLAN) from Rel-8 is standardized. The ANDSF may transfer access network discovery information (e.g., WLAN, WiMAX positional information, and the like) which is accessible at a location of the terminal, inter-system mobility policies (ISMP) to reflect a policy of a provider, and an inter-system routing policy (ISRP) and the terminal may determine IP traffic to be transmitted and an access network to be passed through based on the information. The ISMP may include a network selection rule regarding that the terminal selects one active access network connection (for example, WLAN or 3GPP). The ISRP may include a network selection rule regarding that the terminal selects one or more potential active access network connections (for example, both WLAN or 3GPP). The inter-system routing policy includes multiple access PDN connectivity (MAPCON), IP flow mobility (IFOM), and non-seamless WLAN offloading. Open mobile alliance device management, or the like is used for dynamic provision between the ANDSF and the terminal.

The MAPCON is configured by standardizing a technology that configures and maintains simultaneous multiple PDN connectivity via the 3GPP access network and the non-3GPP access network and enables seamless traffic offloading whole active PDN connection unit seamless traffic offloading. To this end, an ANDSF server provides information on an access point name (APN) that will perform offloading, a priority (routing rule) between the access networks, a time (time of day) to which an offloading method is applied, and information on an access network (validity area) to be offloaded.

The IFOM supports more flexible and subdivided IP flow mobility and seamless offloading than the MAPCON. A technical feature of the IFOM enables the terminal to access the packet data network through different access networks even when being connected to the packet data network by using the same access point name (APN) and enables the mobility and offloading units to move to not the packet data network (PDN) but a specific service IP traffic flow unit to acquire flexibility in service providing. To this end, the ANDSF server provides information on an IP flow that will perform the offloading, the priority (routing rule) between the access networks, the time (time of day) to which the offloading method is applied, and the information on the access network (validity area) to be offloaded.

Non-seamless WLAN offloading represents a technology that does not change a path of predetermined specific IP traffic to the WLAN but completely offloads traffic so as not to pass through an EPC. Since this is not anchored to a P-GW for supporting the mobility, the offloaded IP traffic may not seamlessly to the 3GPP access network again. To this end, the ANDSF server provides information similar to information provided to perform the IFOM to the terminal.

Figure 9:
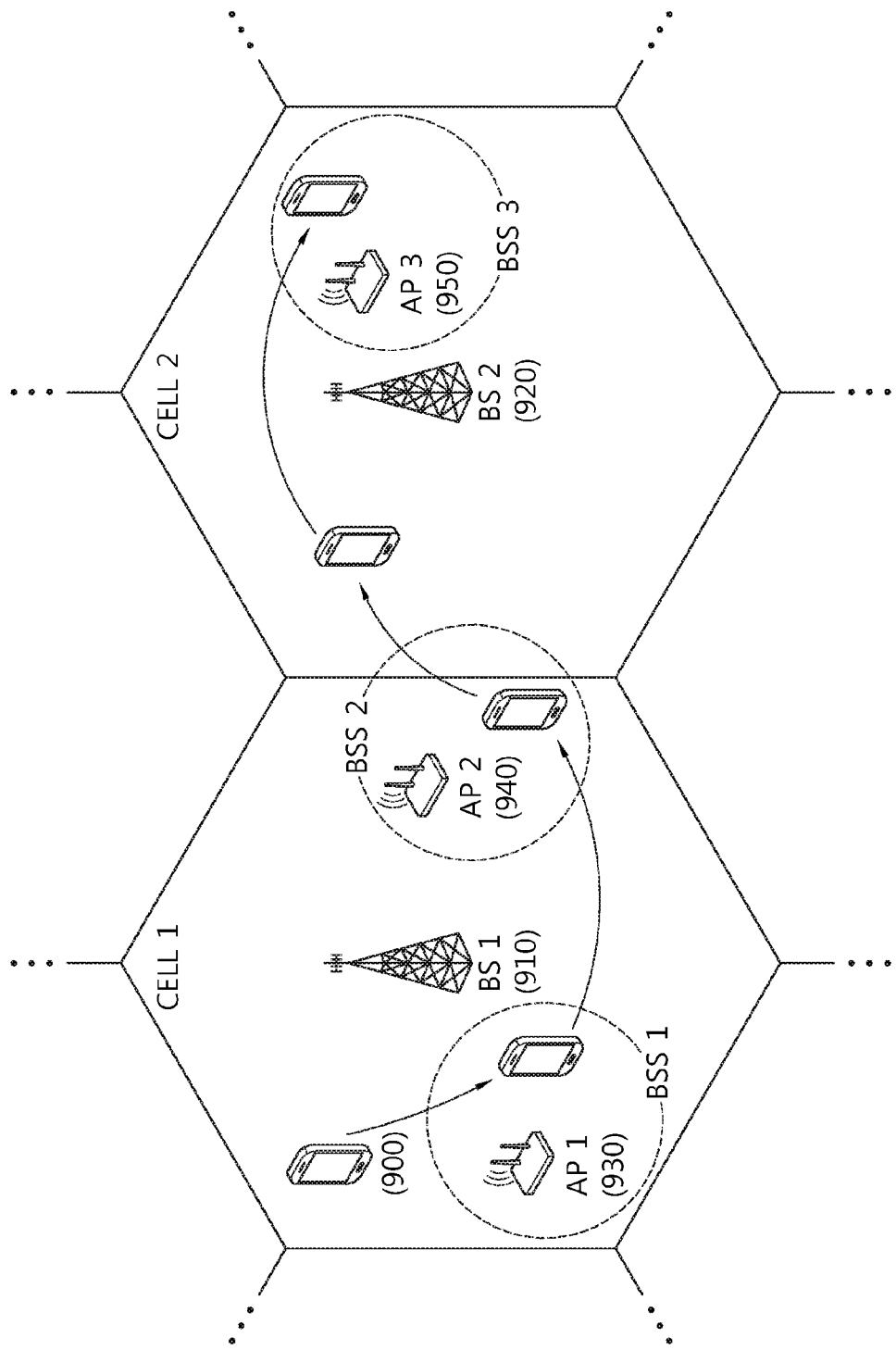
FIG. 9 is a diagram illustrating an example of an environment in which the 3GPP access network and the WLAN access network coexist.

FIG. 9 is a diagram illustrating an example of an environment in which the 3GPP access network and the WLAN access network coexist.

Referring to FIG. 9, as the 3GPP access network, cell 1 in which base station 1 910 is centered and cell 2 in which base station 2 920 is centered are extended. Further, as the WLAN access network, basic service set (BSS) 1 in which an access point (AP)1 930 positioned in the cell 1 is centered and BSS2 in which an AP2 940 is centered are extended and BSS3 in which AP3 950 that exists in cell 2 is centered are extended. Coverage of the cell is illustrated by a solid line and coverage of the BSS is illustrated by dotted lines.

It is assumed that a terminal 900 is configured to perform communication through the 3GPP access network and the WLAN access network. In this case, the terminal 900 may be called a station.

Initially, the terminal 900 establishes connection with the BS1 910 in the cell 1 to perform traffic processing through the 3GPP access network.

The terminal 900 may enter coverage of the BSS1 while moving in coverage of cell 1 and discover the BSS1 through scanning. In this case, the terminal 900 may be connected with the WLAN access network by performing association and authentication procedures with the AP1 930 of the BSS1. As a result, the terminal 900 may process the traffic through the 3GPP access network and the WLAN access network. Meanwhile, when the terminal 900 moves to deviate from the coverage of the BSS1, connection with the WLAN access network may end.

The terminal 900 continuously moves in the coverage of the cell 1 to move to the vicinity of a boundary between the cell 1 and the cell 2 and enters the coverage of the BSS2 to discover the BSS2 through scanning. In this case, the terminal 900 may be connected with the WLAN access network by performing the association and authentication procedures with the AP2 940 of the BSS2. Meanwhile, since the terminal 900 in the coverage of the BSS2 is positioned on the boundary of the cell 1 and the cell 2, service quality through the 3GPP access network may not be excellent. In this case, the terminal 900 may operate to concentratively process the traffic through the WLAN access network.

When the terminal 900 moves to deviate from the coverage of the BSS2 and enters the center of the cell 2, the terminal 900 may terminate the connection with the WLAN access network and process the traffic through the 3GPP access network based on the cell 2.

The terminal 900 may enter the coverage of the BSS3 while moving in the coverage of cell 2 and discover the BSS1 through scanning. In this case, the terminal 900 may be connected with the WLAN access network by performing the association and authentication procedures with the AP3 950 of the BSS3. As a result, the terminal 900 may process the traffic through the 3GPP access network and the WLAN access network.

As described in the example of FIG. 9, under a wireless communication environment in which the 3GPP access network and the non-3GPP access network coexist, the terminal may adaptively process the traffic through the 3GPP access network and/or the non-3GPP access network.

Meanwhile, the terminal needs to determine the non-3GPP access network positioned therearound in order to offload some or all traffic being transmitted/received or to be transmitted/received in the 3GPP access network to the non-3GPP access network. Service coverage of a WLAN access network as one of the non-GEPP access networks is still smaller than that of a macro cell of the 3GPP access network. Therefore, the terminal performs continuous scanning while turning a power supply of a module for WLAN communication in order to discover the service coverage of the WLAN access network and offload the traffic through the discovered service coverage. This may cause a problem that terminal power is continuously consumed.

Meanwhile, it may be important that the terminal selects the 3GPP access network to acquire a gain through offloading in terms of a capacity or quality in offloading the traffic of the 3GPP access network to the non-3GPP access network. The reason is that when an inappropriate non-3GPP access network is selected, a problem may occur, in which the quality of the service through the traffic offloading or the service is stopped.

By considering such a point, the present invention proposes providing information associated with the non-3GPP access network to the terminal. Hereinafter, in describing a communication method based on providing the information associated with the non-3GPP access network to the terminal, it will be described as an example that the non-3GPP access network is the WLAN access network. However, the scope of the present invention is not limited thereto and may be applied even to communication of the terminal associated with other access networks.

Figure 10:
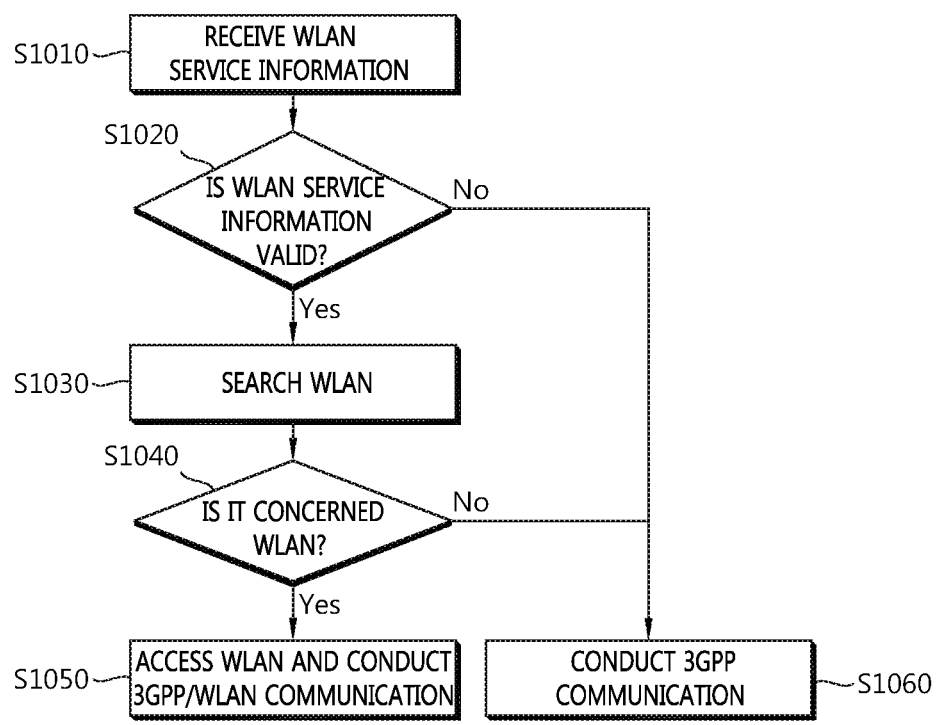
FIG. 10 is a flowchart illustrating a communication method according to an embodiment of the present invention.

FIG. 10 is a flowchart illustrating a communication method according to an embodiment of the present invention.

Referring to FIG. 10, the terminal receives WLAN service information (S1010). The WLAN service information may be transmitted from the 3GPP access network.

The WLAN service information may be provided to the terminal through broadcast signaling from the 3GPP access network. For example, the 3GPP access network may broadcast system information including the WLAN service information.

The WLAN service information may be provided to the terminal through dedicated signaling from the 3GPP access network. For example, the 3GPP access network may transmit an RRC message including the WLAN service information to the terminal.

Under an environment in which the 3GPP access network is shared by a plurality of operators, the WLAN service information may be provided for each PLMN. In this case, a list of the WLAN service information may be provided to the terminal and each WLAN service information may be correlated with each PLMN according to a PLMN order in a PLMN list signaled by the 3GPP access network. For example, first WLAN service information is correlated with a first PLMN of the PLMN list and second WLAN service information is correlated with a second PLMN of the PLMN list and even thereafter, the service information may be sequentially correlated with the PLMNs.

The WLAN service information may include concerted WLAN information and/or validity information associated with validity of the WLAN service information.

A concerned WLAN may be a WLAN access network which the terminal is permitted to access. The concerned WLAN may be a WLAN access network entity in which the terminal is permitted to process the traffic on the 3GPP access network. The concerned WLAN may be a WLAN access network entity which the terminal is permitted to access and the terminal is permitted to process the traffic on the 3GPP access network. The concerned WLAN information may include detailed information given below.

1) Identifier List of Concerned WLAN

The concerned WLAN information may include an identifier list of the concerned WLAN. Identifiers included in the identifier list of the WLAN may be as follows.

WLAN SSID (Service Set Identifier): The SSID may be duplicatively used in a plurality of BSSs.

WLAN BSSID (Basic Service Set Identifier): The BSSID as information for identifying a BSS managed by a specific AP may be generally set as an MAC address of the corresponding AP.

HESSID (Homogeneous Extended Service Set Identifier): The HESSID as the same value as one BSSID among APs and an identifier set by a hotspot operator may be set in the form of the MAC address. All APs in a hotspot network may be set the same HESSID value.

Domain name list: The domain name list may include one or more domain names of the WLAN access network entity.

2) Priority of Concerned WLAN

Information on a priority associated with the concerned WLAN may be provided to the terminal. The priority may be set in correlation with the concerned WLAN list. When a plurality of concerned WLANs is discovered, the terminal may select the WLAN access network according to the priority.

3) Geometric Area Information

Information on a geometric area associated with the concerned WLAN may be provided to the terminal. The terminal may discover a concerned WLAN access network according to the geometric area information. That is, when the terminal decides that the terminal is positioned within an area indicated by the geometric area information, the terminal may start discovering the WLAN access network.

Meanwhile, the terminal decides that the WLAN access network entity found through the discovery is positioned outside the area indicated by the geometric area information not to exclude the corresponding WLAN access network entity from the concerned WLAN. That is, the geometric area information may be used as not a reference indicating whether the found WLAN access network entity is the concerned WLAN which is a valid entity for the traffic offloading but a reference for performing the WLAN discovery.

The geometric area information may be implemented as geometric coordinate information and in this case, the geometric area information may include at least one of latitude, longitude, altitude, and a radius. For example, the geometric area information may specify an area within the radius around a point specified by the latitude and the longitude. As another example, the geometric area information may specify an area within the radius around a point specified by the latitude, the longitude, and the altitude.

4) Channel/Frequency Information

Information on a channel/frequency of the concerned WLAN may be provided to the terminal. Herein, the channel/frequency corresponds to a physical medium having a specific frequency band and a specific bandwidth unlike a channel discussed in the 3GPP access network and hereinafter, the channel/frequency will be referred to as a WLAN channel for distinguishing from the channel in the 3GPP access network. Channel information may be implemented to signal the channel/frequency for each identifier in association with the concerned WLAN identifier list.

5) WLAN Channel Priority

A priority for the WLAN channel signaled within the WLAN service information may be provided to the terminal. The terminal may discover the WLAN according to the priority correlated with the WLAN channel in performing discovery of a plurality of WLAN channels.

6) WLAN Module Operation Indicator

The WLAN service information may include a WLAN module operation indicator indicating whether the terminal turns on the power supply of the WLAN module to start operating the WLAN. The terminal may measure a WLAN signal according to an indication of the WLAN module operation indicator and decide whether to activate the WLAN module for discovering the WLAN.

7) WLAN Association, Authentication/Security Information

The WLAN service information may include association information and authentication/security information for performing an association/authentication procedure of the terminal.

The association information may be commonly applied to all APs or all service sets (e.g., BSS, ESS) or applied for each AP or the service set (BSS, ESS). When the association information is provided to the terminal through the WLAN service information, in the case where the AP or the service set to which the association information may be applied is discovered, the terminal may be permitted to perform an association procedure with the corresponding AP or service set.

The authentication/security information may be commonly applied to all APs or all service sets (e.g., BSS, ESS) or applied for each AP or service set (BSS, ESS). When the authentication/security information is provided to the terminal through the WLAN service information, in the case where the AP or the service set to which the association information may be applied is discovered, the terminal may be permitted to perform the association procedure with the corresponding AP or service set.

The validity information included in the WLAN service information may include detailed information for the terminal to determine the validity of the WLAN service information and be defined as follows.

1) Valid Duration of WLAN Service Information

The validity information may indicate duration in which the WLAN service information is valid. In this case, the WLAN service information may be considered to be valid for duration indicated by the validity information from the time when the terminal receives the WLAN service information. When the valid duration is terminated, the terminal may consider that the WLAN service information is not valid any longer and discard the WLAN service information. The duration indicated by the validity information may be set to a specific time value (e.g., second/minute/hour).

Meanwhile, the validity information may be set to indicate that the validity of the WLAN service information may be decided by the duration. In this case, the duration may be given to the terminal as a default value and the terminal may consider that the WLAN service information is valid for the duration of the default value from an acquisition time of the WLAN service information.

Meanwhile, the validity information may be implemented to indicate a specific absolute time and in this case, the terminal may consider that the WLAN service information is valid before the corresponding time.

2) Valid Area of WLAN Service Information

The validity information may indicate an area in which the WLAN service information is valid. The valid area may be specified as follows.

When the WLAN service information received by the terminal is received, it may be considered that the WLAN service information is valid within a serving cell on the 3GPP access network. When the serving cell is to be changed with movement of the terminal, a terminal which camps on a new serving cell may consider that the WLAN service information is not valid.

It may be considered that the WLAN service information received by the terminal is valid only within specific cells on the 3GPP access network. In this case, the validity information may include a list of the corresponding cells.

It may be considered that the WLAN service information received by the terminal is valid only within a specific area. In this case, the validity information may include at least one of a list of a tracking area in which the WLAN service information is valid, a location area list, and a routing area list.

It may be considered that the WLAN service information received by the terminal is valid only within a cell of a specific PLMN. In this case, the validity information may include a list of PLMNs in which the WLAN service information is valid.

Hereinabove, a reference of the validity of the WLAN service information and implementation of the validity information have been described. Meanwhile, the validity of the WLAN service information may be decided according to at least one or more validity references. For example, the validity of the WLAN service information may be decided by the duration and the cells within the specific cell list and it may be considered that the WLAN service information is valid when the terminal camps on the cell within the cell list and the duration has not yet been terminated. When at least one or more validity references are applied, the validity information may also be set to indicate at least one or more corresponding validity references.

Hereinabove, the validity information is provided while being included in the WLAN service information, but the terminal may determine the validity of the WLAN service information without explicitly providing the validity information. In this case, the validity determination reference of the WLAN service information is provided/set in advance and when the terminal receives the WLAN service information, the terminal may determine the validity of the corresponding information according to the previously provided/set reference.

Referring back to FIG. 10, the terminal that receives the WLAN service information determines the validity of the WLAN service information (S1020).

When the validity information is included in the WLAN service information, the terminal may determine whether the WLAN service is valid based on the validity information. The validity information may be set to indicate the time when the WLAN service information is valid and/or the area where the WLAN service is valid and since a detailed determination scheme has been described above, a detailed description will be omitted.

When the validity information is not included in the WLAN service information, the terminal may determine whether the WLAN service is valid based on a predetermined validity determination reference. The references associated with the time when the WLAN service information is valid and/or the area where the WLAN service information is valid may be set in the terminal in advance and the terminal may determine the validity of the WLAN service information received by using the set references.

When it is determined that the WLAN service information is valid, the terminal may determine whether the traffic processing is possible through the WLAN access network and decide to process the traffic through the determination when the traffic processing is possible. To this end, the terminal may activate the WLAN module for communication through the WLAN access network and decide to start discovering the WLAN.

Additionally, when the terminal is positioned within a specific area by the geometric area information included in the concerned WLAN information and the WLAN service information is valid, the terminal may determine whether the traffic processing is possible through the WLAN access network and decide to perform the traffic processing through the determination when the traffic processing is possible. To this end, the terminal may decide to start the WLAN discovery operation.

When it is determined that the WLAN service information is not valid, the terminal does not determine that the traffic processing is possible through the WLAN access network. Therefore, the terminal may not perform the WLAN discovery operation. The WLAN service information was valid in the past, but when the WLAN service information is not valid any longer, the terminal may not perform the WLAN discovery operation any longer. Further, the WLAN module for communication through the WLAN access network may be deactivated. In this case, the terminal may process the traffic on the 3GPP through the 3GPP access network (S1060).

The terminal having the valid WLAN service information performs the WLAN discovery (S1030). The WLAN discovery may be an operation of finding the WLAN access network entity that exists around the terminal. To this end, the terminal may perform scanning. A scanning operation may be performed according to passive scanning and/or active scanning defined in the WLAN.

According to the passive scanning, the terminal may discover the WLAN access network entity through receiving a beacon frame transmitted from the WLAN access network entity. The terminal may discover an AP and/or a non-AP station that transmits the beacon frame. All or some of the WLAN system information are included in the beacon frame broadcasted from the AP and/or the non-AP station. In more detail, as identification information for the WLAN access network entity for the corresponding AP and/or the non-AP station, the BSSID, the SSID, the HESSID, and the like may be included in the beacon frame. Further, capability information which may be supported by the WLAN access network entity may be included in the beacon frame.

According to the active scanning, the terminal may transmit a probe request frame. The probe request frame may be transmitted in a broadcast scheme. The terminal may receive a probe response frame from a specific WLAN access network entity as a response to the probe request frame and discover the corresponding WLAN access network entity. The terminal may discover an AP and/or a non-AP station that transmits the probe response frame. Meanwhile, the terminal may transmit the probe request frame at least one channel/frequency according to the channel/frequency priority defined in the WLAN service information. All or some of the WLAN system information are included in the probe response frame transmitted from the AP and/or the non-AP station. In more detail, as the identification information for the WLAN access network entity for the corresponding AP and/or the non-AP station, the BSSID, the SSID, the HESSID, and the like may be included in the probe response frame. Further, the capability information which may be supported by the WLAN access network entity may be included in the probe response frame.

The terminal decides whether the WLAN access network discovered through the WLAN discovery corresponds to the concerned WLAN that may process the traffic on the 3GPP of the terminal (S1040). That is, the terminal determines whether the discovered WLAN access network entity is the WLAN access network entity in which the traffic on the 3GPP access network is permitted/possible.

The terminal may use the concerned WLAN information of the WLAN service information in deciding whether the WLAN access network corresponds to the concerned WLAN. For example, when the identifier of the discovered WLAN is included in the concerned WLAN identifier list in the concerned WLAN information, the terminal may decide that the discovered WLAN corresponds to the concerned WLAN. For example, when the BSSID which is the identifier of the discovered AP or BSS is included in the BSSID list of the concerned WLAN information, the terminal may decide that the corresponding AP or BSS corresponds to the concerned WLAN.

Additionally, the terminal may additionally consider at least one of a signal level measurement value of the discovered WLAN, a signal level measurement value of the 3GPP access network, a traffic load level of the WLAN, and a traffic load level of the 3GPP access network in determining whether the discovered WLAN corresponds to the concerned WLAN. For example, when the signal level measurement value of the WLAN is equal to or more than a specific threshold value, it may be decided that the corresponding WLAN is the concerned WLAN. When the traffic load level of the WLAN is equal to or less than a specific threshold value, it may be decided that the corresponding WLAN is the concerned WLAN. When the 3GPP signal level measurement value is equal to or less than a specific threshold value, it may be decided that the corresponding WLAN is the concerned WLAN. When the 3GPP traffic load is equal to or more than a specific threshold value, it may be decided that the corresponding WLAN is the concerned WLAN.

The terminal may decide whether the WLAN is the concerned WLAN according to whether the discovered WLAN access network entity corresponds to the WLAN capability which may be supported by the terminal. Information on the discovered WLAN access network entity may be provided to the terminal while being included in the beacon frame, the probe response frame, and an association response frame transmitted during the association procedure transmitted from the corresponding entity. The terminal may check whether the discovered WLAN access network entity corresponds to a WLAN which may be supported thereby and when the terminal may support the WLAN, the terminal may decide that the corresponding entity is the concerned WLAN.

The terminal may decide whether the corresponding WLAN is the concerned WLAN according to a result of performing the association/authentication with the discovered WLAN access network entity. When the association/authentication with the discovered WLAN access network entity is successfully performed, the terminal may decide that the discovered WLAN access network entity corresponds to the concerned WLAN.

When the discovered WLAN is decided as the concerned WLAN, the terminal may access the concerned WLAN and process the traffic on the 3GPP through the 3GPP/WLAN access network (S1050). The terminal's access to the concerned WLAN access network entity may include performing the association and authentication procedures with the corresponding AP. The association procedure may be performed as the terminal transmits the association request frame to the WLAN access network entity and receives the association response frame from the AP as a response thereto. The authentication procedure may be performed through transmission/reception of an authentication frame between the WLAN access network entities.

Processing the traffic on the 3GPP through the 3GPP/WLAN access network may include processing some and/or all traffic through the 3GPP or WLAN access network. The terminal may process all traffic through the 3GPP access network or the WLAN access network. Alternatively, the terminal may process some traffic through the 3GPP access network and residual traffic through the WLAN access network.

The terminal may process the traffic based on a signal level and a load situation of the 3GPP access network and a signal level and a load situation of the WLAN access network. For example, when the signal level of the 3GPP access network is weak and the signal level of the WLAN access network is excellent, the terminal may process all traffic through the WLAN access network or increase the amount of traffic processed through the WLAN access network. As another example, when a load of the 3GPP access network is large and a load of the WLAN access network is small, the terminal may process all traffic through the WLAN access network or increase the amount of traffic processed through the WLAN access network. That is, the terminal may adaptively process the traffic based on a service providing environment of the 3GPP access network and the WLAN access network.

When it is decided that the discovered WLAN does not correspond to the concerned WLAN, the terminal may process the traffic on the 3GPP through the 3GPP access network without accessing the WLAN (S1060).

Figure 11:
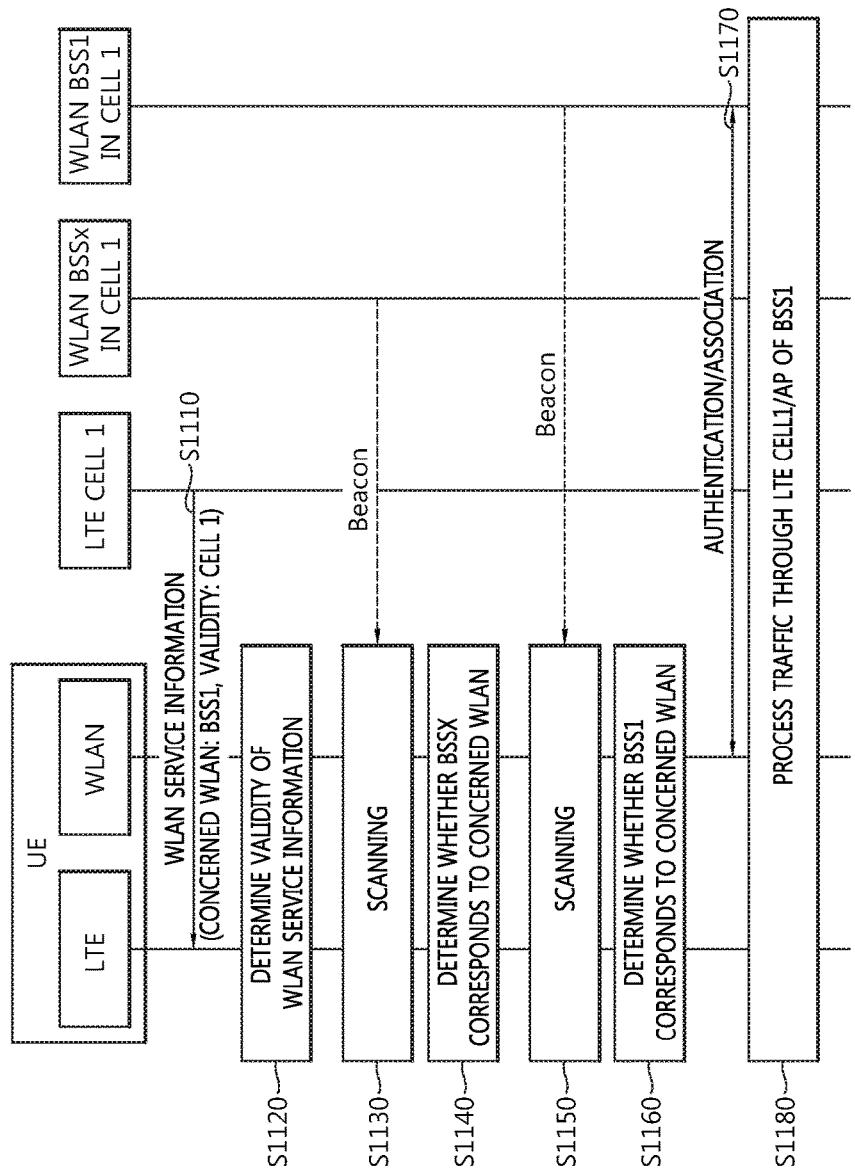
FIG. 11 is a diagram illustrating an example of a communication method according to an embodiment of the present invention.

FIG. 11 is a diagram illustrating an example of a communication method according to an embodiment of the present invention.

Referring to FIG. 11, it is assumed that the terminal supports both communication based on LTE and communication based on the WLAN and it is assumed that the LTE communication and the WLAN communication may be independently performed. It is assumed that the terminal camps on cell 1 based on the LTE and/or the terminal receives a service by establishing the connection with the cell 1. It is assumed that BSS1 and BSSx are extended in coverage of the cell 1.

The terminal receives WLAN service information from the cell 1 (S1110). The WLAN service information may be transmitted with being included in system information broadcasted by the cell 1. The WLAN service information may be transmitted to the terminal while being included in an RRC message from the cell 1.

The WLAN service information may include concerned WLAN information and the concerned WLAN information may include an identifier list of the concerned WLAN including a BSSID of the BSS1.

The WLAN service information may include validity information and the validity information may indicate that the WLAN service information is valid in the cell 1.

The terminal determines the validity of the received WLAN service information (S1120). Since the terminal camps on the cell 1, the terminal may decide that the WLAN service information is valid. As a result, the terminal may start discovering the WLAN access network.

The terminal performs scanning to discover the WLAN access network (S1130). The terminal may perform scanning. Through passive scanning, the terminal receives a beacon frame transmitted from an AP of the BSSx to discover the BSSx. The BSSID of the BSSx and system information for operating the WLAN in the BSSx may be included in the beacon frame.

The terminal determines whether the BSSx corresponds to the concerned WLAN based on the WLAN service information (S1140). Since the BSSID of the BSSx is not included in the concerned WLAN identifier list of the concerned WLAN information, the terminal may decide that the BSSx does not correspond to the concerned WLAN.

The terminal performs scanning to discover the WLAN access network (S1150). The terminal may perform the passive scanning. Through the scanning, the terminal receives a beacon frame transmitted from the AP of the BSS1 to discover the BSS1. The BSSID of the BSS1 and the system information for operating the WLAN in the BSS1 may be included in the beacon frame.

The terminal determines whether the BSS1 corresponds to the concerned WLAN based on the WLAN service information (S1160). Since the BSSID of the BSS1 is included in the concerned WLAN identifier list of the concerned WLAN information, the terminal may decide that the BSS1 corresponds to the concerned WLAN.

The terminal performs the association/authentication procedure to perform the WLAN communication in the BSS1 (S1170). The terminal transmits and receives the authentication frame to and from the AP of the BSS1 and exchanges the association request frame and the association response frame to perform the authentication and association procedures.

The terminal processes the traffic through the cell 1 and/or the AP of the BSS1 (S1180). The terminal may process the traffic through a base station in the existing cell 1. The terminal associated with the AP may process the traffic on the 3GPP through exchanging the frame with the AP. The terminal may adaptively decide what degree of traffic among all traffic to process through the WLAN access network according to a service environment in the cell 1 and the BSS1.

Figure 12:
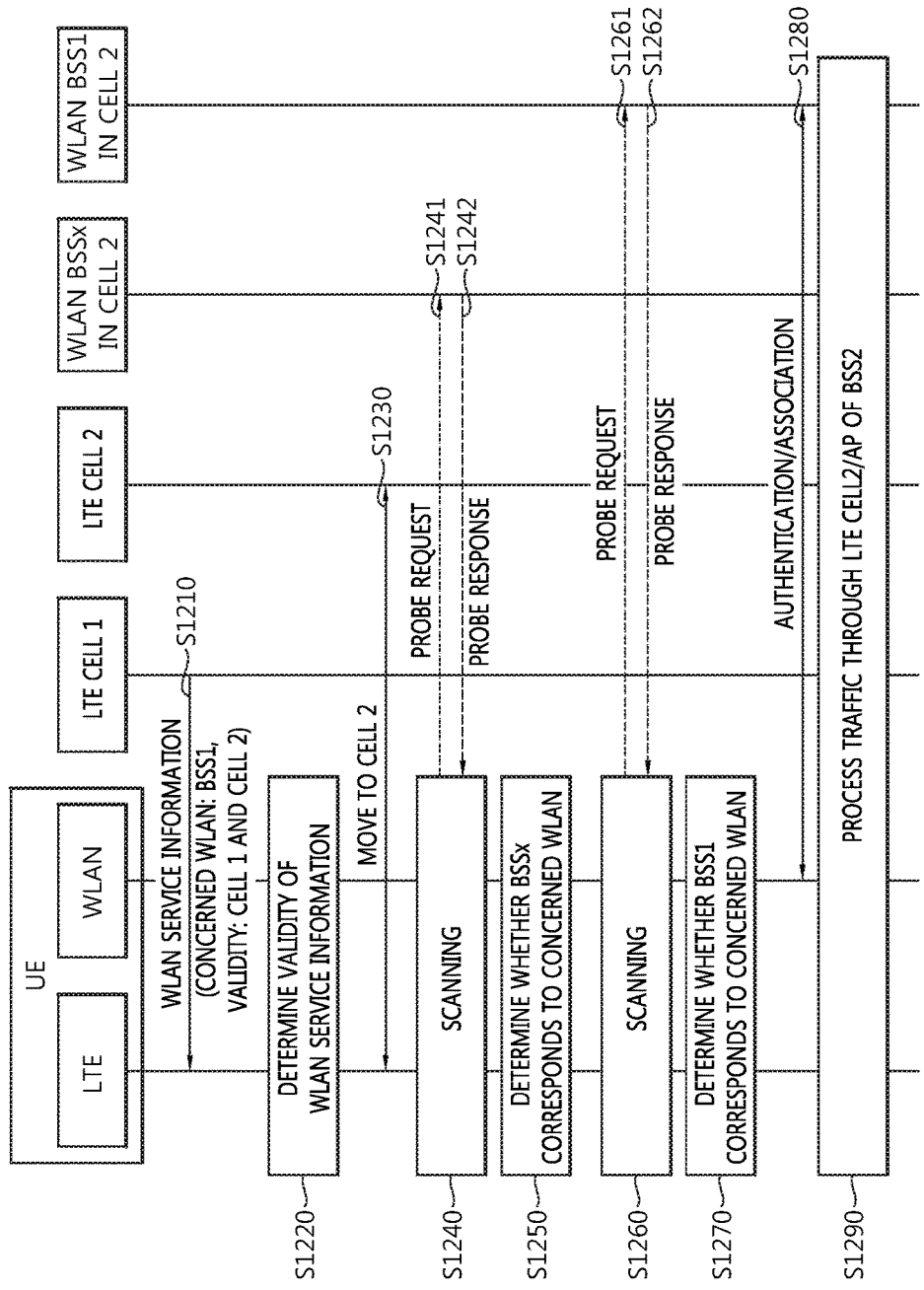
FIG. 12 is a diagram illustrating another example of the communication method according to another embodiment of the present invention.

FIG. 12 is a diagram illustrating another example of the communication method according to another embodiment of the present invention.

Referring to FIG. 12, it is assumed that the terminal supports both the communication based on the LTE and the communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 and the BSSx are extended in coverage of the cell 2.

The terminal receives the WLAN service information from the cell 1 (S1210). The WLAN service information may be transmitted while being included in the system information broadcasted by the cell 1. The WLAN service information may be transmitted to the terminal while being included in the RRC message from the cell 1.

The WLAN service information may include the concerned WLAN information and the concerned WLAN information may include the identifier list of the concerned WLAN including the BSSID of the BSS1.

The WLAN service information may include the validity information and the validity information may indicate that the WLAN service information is valid in the cell 1 and the cell 2.

The terminal determines the validity of the received WLAN service information (S1220). Since the terminal camps on the cell 1, the terminal may decide that the WLAN service information is valid. As a result, the terminal may start discovering the WLAN access network.

The terminal moves to the cell 2 from the cell 1 (S1230). The terminal may move through handover or cell reselection, and the terminal may camp on the cell 2 and perform connection establishment with the cell 2. The terminal may check whether the WLAN service information has still been valid and decide that the WLAN service information is valid even in the cell 2 through the validity information.

The terminal performs scanning to discover the WLAN access network (S1240). The terminal may perform active scanning. The terminal may broadcast a probe request frame for the active scanning (S1241). The BSSx that receives the probe request frame transmits to the terminal a probe response frame as a response thereto (S1242). Through the probe response frame, the terminal may discover the BSSx. The BSSID of the BSSx and the system information for operating the WLAN in the BSSx may be included in the probe response frame.

The terminal determines whether the BSSx corresponds to the concerned WLAN based on the WLAN service information (S1250). Since the BSSID of the BSSx is not included in the concerned WLAN identifier list of the concerned WLAN information, the terminal may decide that the BSSx does not correspond to the concerned WLAN.

The terminal performs scanning to discover the WLAN access network (S1260). The terminal may perform active scanning. The terminal may broadcast the probe request frame for the active scanning (S1261). The BSS1 that receives the probe request frame transmits to the terminal the probe response frame as the response thereto (S1262). Through the probe response frame, the terminal may discover the BSS1. The BSSID of the BSS1 and the system information for operating the WLAN in the BSS1 may be included in the probe response frame.

The terminal determines whether the BSS1 corresponds to the concerned WLAN based on the WLAN service information (S1270). Since the BSSID of the BSS1 is included in the concerned WLAN identifier list of the concerned WLAN information, the terminal may decide that the BSS1 corresponds to the concerned WLAN.

The terminal performs the association/authentication procedure to perform the WLAN communication in the BSS1 (S1280). The terminal transmits and receives the authentication frame to and from the AP of the BSS1 and exchanges the association request frame and the association response frame to perform the authentication and association procedures.

The terminal processes the traffic through the cell 1 and/or the AP of the BSS1 (S1290). The terminal may process the traffic through the base station in the existing cell 1. The terminal associated with the AP may process the traffic on the 3GPP through exchanging the frame with the AP. The terminal may adaptively decide what degree of traffic among all traffic to process through the WLAN access network according to the service environment in the cell 1 and the BSS1.

Figure 13:
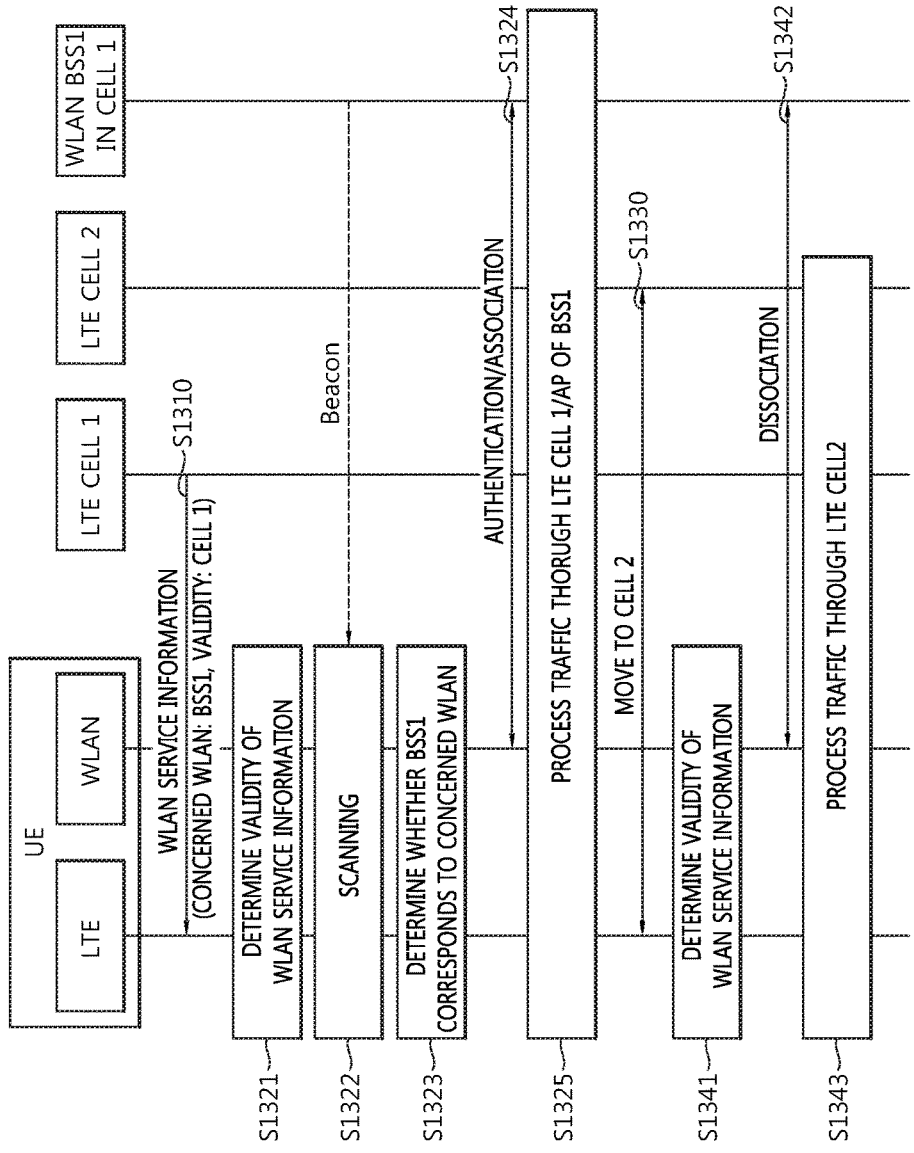
FIG. 13 is a diagram illustrating yet another example of the communication method according to the embodiment of the present invention.

FIG. 13 is a diagram illustrating yet another example of the communication method according to the embodiment of the present invention.

Referring to FIG. 13, it is assumed that the terminal supports both communication based on LTE and communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 is extended in the coverage of the cell 1.

The terminal receives the WLAN service information from the cell 1 (S1310). The WLAN service information may be transmitted while being included in the system information broadcasted by the cell 1. The WLAN service information may be transmitted to the terminal while being included in the RRC message from the cell 1.

The WLAN service information may include the concerned WLAN information and the concerned WLAN information may include the identifier list of the concerned WLAN including the BSSID of the BSS1.

The WLAN service information may include the validity information and the validity information may indicate that the WLAN service information is valid in the cell 1.

The terminal determines the validity of the received WLAN service information (S1321). Since the terminal camps on the cell 1, the terminal may decide that the WLAN service information is valid. As a result, the terminal may start discovering the WLAN access network.

The terminal performs scanning to discover the WLAN access network (S1322). The terminal may perform the passive scanning. Through the scanning, the terminal receives the beacon frame transmitted from the AP of the BSS1 to discover the BSS1. The BSSID of the BSS1 and the system information for operating the WLAN in the BSS1 may be included in the beacon frame.

The terminal determines whether the BSS1 corresponds to the concerned WLAN based on the WLAN service information (S1323). Since the BSSID of the BSS1 is included in the concerned WLAN identifier list of the concerned WLAN information, the terminal may decide that the BSS1 corresponds to the concerned WLAN.

The terminal performs the association/authentication procedure to perform the WLAN communication in the BSS1 (S1324). The terminal transmits and receives the authentication frame to and from the AP of the BSS1 and exchanges the association request frame and the association response frame to perform the authentication and association procedures.

The terminal processes the traffic through the cell 1 and/or the AP of the BSS1 (S1325). The terminal may process the traffic through the base station in the existing cell 1. The terminal associated with the AP may process the traffic on the 3GPP through exchanging the frame with the AP. The terminal may adaptively decide what degree of traffic among all traffic to process through the WLAN access network according to the service environment in the cell 1 and the BSS1.

The terminal moves to the cell 2 from the cell 1 while processing the traffic (S1330). The terminal may move through the handover or cell reselection, and the terminal may camp on the cell 2 and perform the connection establishment with the cell 2.

The terminal that moves to the cell 2 determines the validity of the WLAN service information on the cell 2 (S1341). The terminal may verify that the cell 2 is not a cell in which the WLAN service information indicated by the validity information is valid and decide that the WLAN service information is not valid any longer. As a result, it can be seen that the terminal is not permitted to process the traffic through the WLAN access network any longer. Further, the terminal may discard the WLAN service information.

The terminal is dissociated from cancels the association with the WLAN access network (S1342). The terminal may transmit a dissociation frame to the AP of the BSS1 to be dissociated from the AP. As a result, the terminal processes all traffic through the cell 2 which is the 3GPP access network (S1343).

Figure 14:
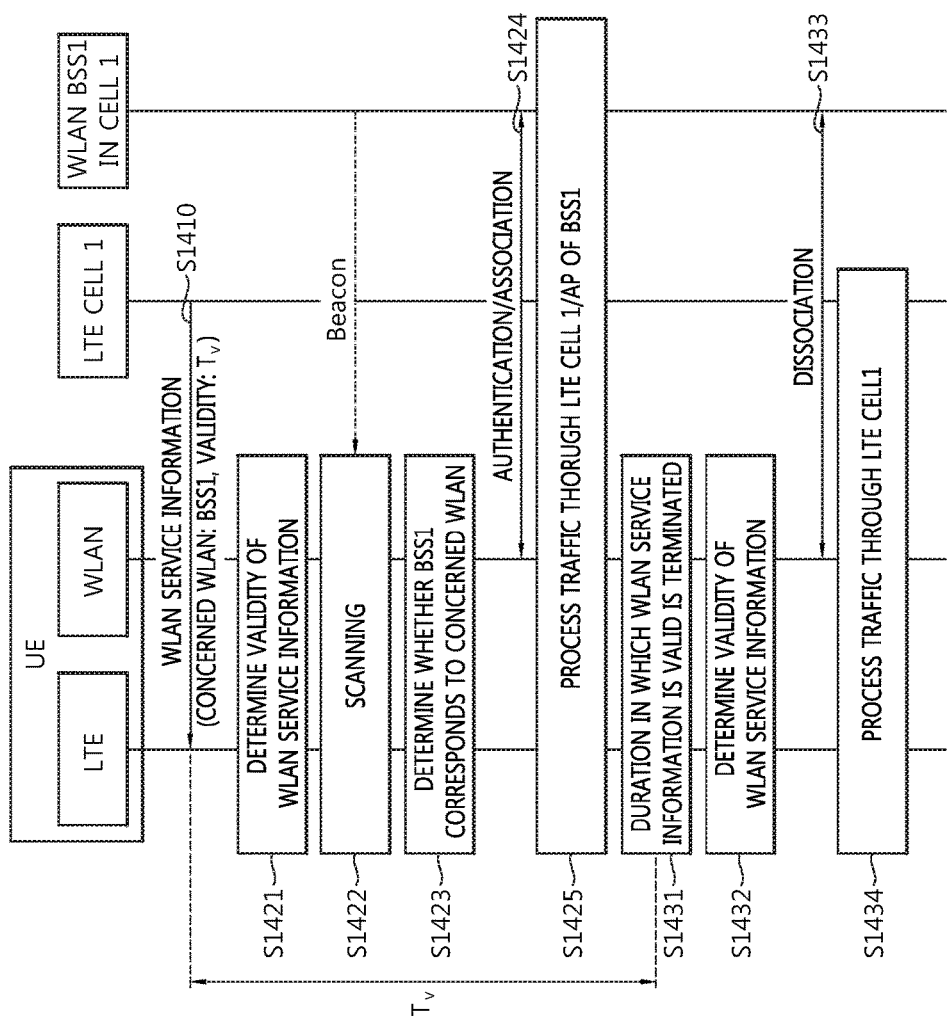
FIG. 14 is a diagram illustrating still yet another embodiment of the communication method according to the embodiment of the present invention.

FIG. 14 is a diagram illustrating still yet another embodiment of the communication method according to the embodiment of the present invention.

Referring to FIG. 14, it is assumed that the terminal supports both the communication based on the LTE and the communication based on the WLAN and it is assumed that the LTE communication and the WLAN communication may be independently performed. It is assumed that the terminal camps on the cell 1 based on the LTE and/or the terminal receives the service by establishing the connection with the cell 1. It is assumed that the BSS1 is extended in the coverage of the cell 1.

The terminal receives the WLAN service information from the cell 1 (S1410). The WLAN service information may be transmitted while being included in the system information broadcasted by the cell 1. The WLAN service information may be transmitted to the terminal while being included in the RRC message from the cell 1.

The WLAN service information may include the concerned WLAN information and the concerned WLAN information may include the identifier list of the concerned WLAN including the BSSID of the BSS1.

The WLAN service information may include the validity information and the validity information may indicate valid duration $T_v$ in which the WLAN service information is valid. When the terminal acquires the validity information indicating the valid duration of the WLAN service information, the terminal may start a valid timer set as the indicated duration.

The terminal determines the validity of the received WLAN service information (S1421). Since the valid duration of the WLAN service information is not terminated, the terminal may decide that the WLAN service information is valid. As a result, the terminal may start discovering the WLAN access network.

The terminal performs scanning to discover the WLAN access network (S1422). The terminal may perform the passive scanning. Through the scanning, the terminal receives the beacon frame transmitted from the AP of the BSS1 to discover the BSS1. The BSSID of the BSS1 and the system information for operating the WLAN in the BSS1 may be included in the beacon frame.

The terminal determines whether the BSS1 corresponds to the concerned WLAN based on the WLAN service information (S1423). Since the BSSID of the BSS1 is included in the concerned WLAN identifier list of the concerned WLAN information, the terminal may decide that the BSS1 corresponds to the concerned WLAN.

The terminal performs the association/authentication procedure to perform the WLAN communication in the BSS1 (S1424). The terminal transmits and receives the authentication frame to and from the AP of the BSS1 and exchanges the association request frame and the association response frame to perform the authentication and association procedures.

The terminal processes the traffic through the cell 1 and/or the AP of the BSS1 (S1425). The terminal may process the traffic through the base station in the existing cell 1. The terminal associated with the AP may process the traffic on the 3GPP through exchanging the frame with the AP. The terminal may adaptively decide what degree of traffic among all traffic to process through the WLAN access network according to the service environment in the cell 1 and the BSS1.

The terminal may terminate the valid duration of the WLAN service information while processing the traffic through the 3GPP/WLAN access network (S1431). That is, the valid timer associated with the WLAN service information may be terminated. The terminal may determine the validity of the WLAN service information again and decide that the WLAN service information is not valid any longer (S1432).

The terminal is dissociated from the WLAN access network (S1442). The terminal may transmit the dissociation frame to the AP of the BSS1 to be dissociated from the AP. As a result, the terminal processes all traffic through the cell 2 which is the 3GPP access network (S1443).

The 3GPP access network provides the service information so as for the terminal to perform communication by accessing another access network. The terminal may discover and access another access network through the service information. Therefore, terminal's attempt to discover and access an unnecessary non-3GPP access network is avoided to prevent unnecessary power consumption of the terminal. Since some and/or all of traffic of the terminal may be processed through another access network, efficiency of traffic processing may be improved and an overload phenomenon of the 3GPP based access network may be alleviated. Accordingly, a QoS for the corresponding traffic may be prevented from being deteriorated.

Figure 15:
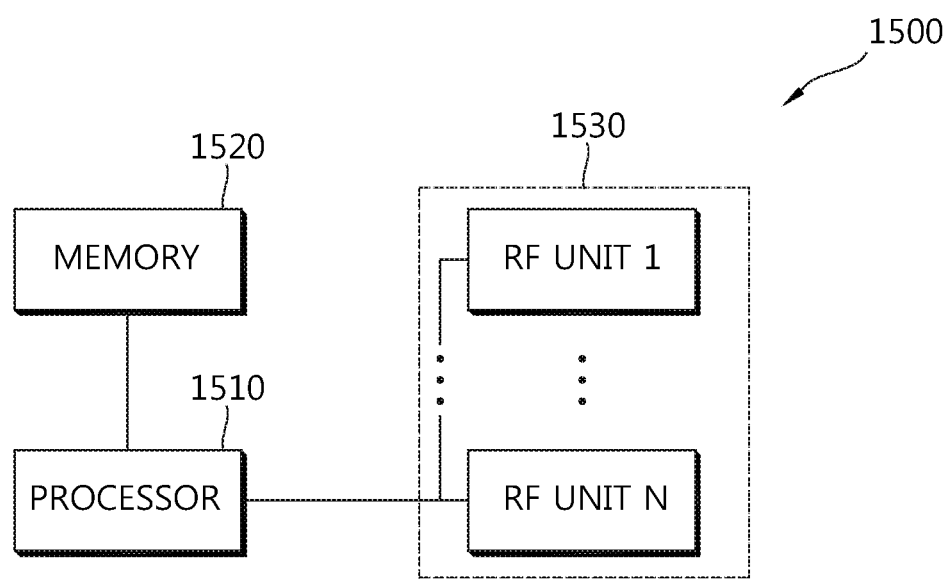
FIG. 15 is a block diagram illustrating a wireless apparatus in which the embodiment of the present invention can be implemented.

FIG. 15 is a block diagram illustrating a wireless apparatus in which the embodiment of the present invention can be implemented. The apparatus may implement the terminal and/or network (base station or another network entity) in the embodiments of FIGS. 10 to 14.

Referring to FIG. 15, the wireless apparatus 1500 includes a processor 1510, a memory 1520, and a radio frequency (RF) unit 1530.

The processor 1510 implements a function, a process, and/or a method which are proposed. The processor 1510 is configured to receive the service information on the non-3GPP access network according to the embodiment of the present invention. The processor 1510 is configured to determine the validity of the non-3GPP access network service information. The processor 1510 is configured to discover the non-3GPP access network and decide whether the discovered non-3GPP access network entity is the concerned access network. The processor 1510 is configured to process the traffic through the 3GPP/non-3GPP access network. The processor 1510 may be configured to perform the embodiment of the present invention described with reference to FIGS. 10 to 14.

The RF unit 1530 is connected with the processor 1510 to transmit and receive a radio signal. The RF unit 1530 may include one or more RF units for 3GPP based access network communication and non-3GPP based access network communication.

The processor may include an application-specific integrated circuit (ASIC), different chip sets, a logic circuit, and/or a data processing apparatus. In FIG. 15, it is illustrated that the single processor 1510 is configured to control and manage all RF units for each access network communication, but the wireless apparatus according to the present invention is not limited thereto. An embodiment in which the respective RF units for each access network communication are functionally coupled with the respective processors may be available.

The memory 1520 may include a read-only memory (ROM), a random access memory (RAM), a flash memory, a memory card, a storage medium, and/or other storage devices. The RF unit 1530 may include a baseband circuit for processing the radio signal. When the embodiment is implemented by software, the aforementioned technique may be implemented by a module (a process, a function, and the like) performing the aforementioned function. The module may be stored in the memory 1520 and executed by the processor 1510. The memory 1520 may be present inside or outside the processor 1510 and connected with the processor 1510 by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting traffic steering information to a user equipment (UE), the method performed by a first network and comprising:
   transmitting, to the UE, a public land mobile network (PLMN) list; and
   transmitting, to the UE, an information list which includes a plurality of entries, each entry being information relevant for traffic steering per PLMN,
   wherein each entry included in the information list is correlated with each PLMN according to a PLMN order in the PLMN list, and
   wherein, if two entries are included in the information list, a first of the two entries is correlated with a first PLMN in the PLMN list and a second of the two entries is correlated with a second PLMN in the PLMN list.

2. The method of claim 1, wherein the PLMN list and the information list are transmitted for steering traffic from the first network to a second network.

3. The method of claim 2, wherein the first network is an evolved-UMTS terrestrial radio access network (E-UTRAN) and the second network is a wireless local area network (WLAN).

4. The method of claim 2, wherein the information relevant for traffic steering per PLMN comprises an identity of the second network.

5. The method of claim 4, wherein the identity of the second network comprises a service set identifier (SSID) of the second network.

6. The method of claim 1, wherein the information list is transmitted through system information.

7. The method of claim 1, wherein the information list is broadcast by the first network.

8. An apparatus for transmitting traffic steering information to a user equipment (UE), the apparatus comprising:
   a transceiver transmitting and receiving a radio signal; and
   a processor coupled to the transceiver,
   wherein the processor is configured to:
   transmit, to the UE, a public land mobile network (PLMN) list, and
   transmit, to the UE, an information list which includes a plurality of entries, each entry being information relevant for traffic steering per PLMN,
   wherein each entry included in the information list is correlated with each PLMN according to a PLMN order in the PLMN list, and
   wherein, if two entries are included in the information list, a first of the two entries is correlated with a first PLMN in the PLMN list and a second of the two entries is correlated with a second PLMN in the PLMN list.

9. The apparatus of claim 8, wherein the PLMN list and the information list are transmitted for steering traffic from a first network to a second network.

10. The apparatus of claim 9, wherein the first network is an evolved-UMTS terrestrial radio access network (E-UTRAN) and the second network is a wireless local area network (WLAN).

11. The apparatus of claim 9, wherein the information relevant for traffic steering per PLMN comprises an identity of the second network.

12. The apparatus of claim 11, wherein the identity of the second network comprises a service set identifier (SSID) of the second network.

13. The apparatus of claim 8, wherein the information list is transmitted through system information.

14. The apparatus of claim 8, wherein the information list is broadcast by the apparatus.

15. A method for receiving traffic steering information from a first network, the method performed by a user equipment (UE) and comprising:
   receiving, from the first network, a public land mobile network (PLMN) list; and
   receiving, from the first network, an information list which includes a plurality of entries, each entry being information relevant for traffic steering per PLMN,
   wherein each entry included in the information list is correlated with each PLMN according to a PLMN order in the PLMN list, and
   wherein, if two entries are included in the information list, a first of the two entries is correlated with a first PLMN in the PLMN list and a second of the two entries is correlated with a second PLMN in the PLMN list.

16. The method of claim 15, wherein the PLMN list and the information list are transmitted for steering traffic from the first network to a second network.

17. The method of claim 16, wherein the first network is an evolved-UMTS terrestrial radio access network (E-UTRAN) and the second network is a wireless local area network (WLAN).

18. The method of claim 16, wherein the information relevant for traffic steering per PLMN comprises an identity of the second network.

19. The method of claim 18, wherein the identity of the second network comprises a service set identifier (SSID) of the second network.

20. The method of claim 15, wherein the information list is transmitted through system information.

\* \* \* \* \*